W. G. TURNER.
DEVICE FOR HOLDING BALE TIES WHILE BEING COUPLED.
APPLICATION FILED JUNE 1, 1918.
1,332,646.
Patented Mar. 2, 1920.
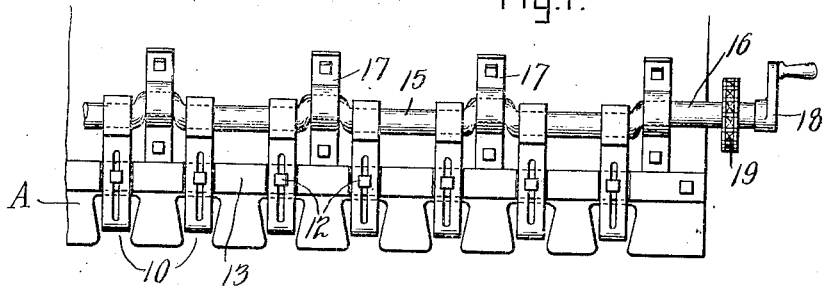
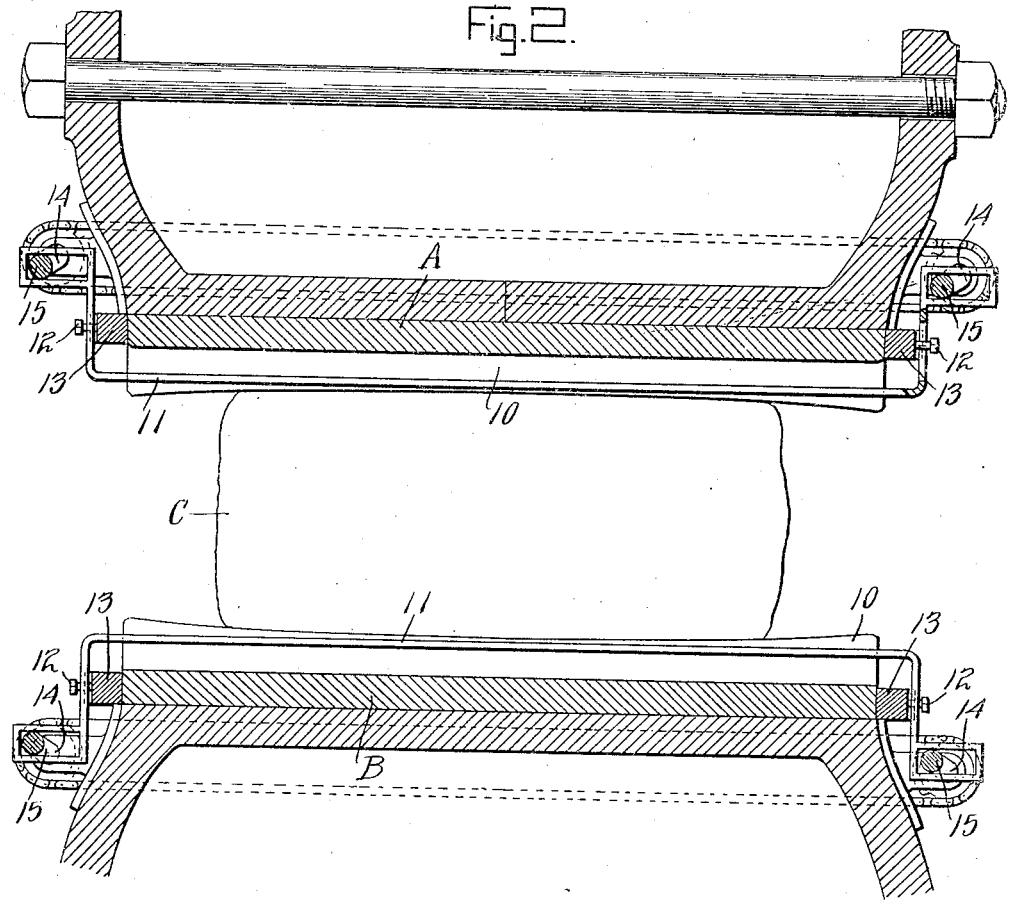
Inventor
William G. Turner
By Bradford & Doolittle,
Attorneys.

UNITED STATES PATENT OFFICE.

WILLIAM GRUBB TURNER, OF MEMPHIS, TENNESSEE.

DEVICE FOR HOLDING BALE-TIES WHILE BEING COUPLED.

1,332,646.  Specification of Letters Patent.  Patented Mar. 2, 1920.

Application filed June 1, 1918. Serial No. 237,733.

*To all whom it may concern:*

Be it known that I, WILLIAM GRUBB TURNER, a citizen of the United States, residing at Memphis, Shelby county, and State of Tennessee, have invented and discovered certain new and useful Improvements in Devices for Holding Bale-Ties While Being Coupled, of which the following is a specification.

My said invention consists in the construction and arrangement of mechanism for holding bale ties while their ends are being coupled or secured together, as in the operation of baling cotton, or repressing cotton at a cotton compress, whereby the expansion or relaxation of the tie is avoided during such operation and the undue expansion of the bale when released from the jaws of the compress is prevented, all of which will be hereinafter more fully described and claimed.

Referring to the accompanying drawings which are made a part hereof, and on which similar reference characters indicate similar parts, Figure 1 is a front elevation of a portion of the edge of one of the platens of a cotton compress showing my invention applied thereto, and Fig. 2, a cross section through such a compress.

In said drawings the portions marked A represent the upper platen, B the lower platen and C the bale of cotton between said platens.

The compress employed is in the main of a common and well known type and requires no special description. Each of the platens is formed with transverse channels 10 as is usual. In each of these channels I mount a filler bar 11 which is adapted to slide in and out of said channel toward and from the floor thereof. Said filler bars are of a width to substantially fill the channels at their mouths and have their ends bent to extend at right angles thereto to embrace the edges of the platen. Said ends are formed with slots through which pins 12 extend into the edge of the platen, or into strips 13 mounted on the edges of the platen. Said bars also, are formed to extend beyond said pins and bent into horizontal loops, forming short ways or slots 14 in which a crank 15 of a crank shaft 16 is mounted. Said crank shaft 16 is supported by bearings 17 on the edge of the platen and has a crank 18 for operating the same or it may be connected and operated by power from any convenient source. A sprocket wheel 19, or other gear, on each shaft enables the shafts on each side to be geared together.

The two platens are fitted in like manner and the filler bars of each platen are each connected at each end to a crank-shaft extending from end to end of the platen.

In operation after the bands are put in place and drawn taut by the manipulator the filler bars are forced against the surface of said bands by turning the crank-shaft, through the medium of the crank 18, or any appropriate power, until the band is firmly pressed between the filler bars and the side of the bale thus held from relaxing or withdrawing from its position in close juxtaposition to the bale. The band is thus held while the free ends are buckled or coupled in any usual or appropriate manner when the bale is released from the jaws of the compress. By this means the usual relaxation in the density of the bale after being tied is prevented and a very much higher density maintained in the bale than has heretofore been possible, thus reducing the size of the bale and consequently reducing the space required for its storage and shipment with the consequent advantages in the saving of space and expense.

Having thus fully described my said invention, what I claim as new and desire to secure by Letters Patent, is:

1. The combination with a cotton compress of filler bars mounted in the channels of the platens thereof, a crank-shaft, the filler bars of each of said platens being connected with the crank-shaft, and means for operating said crank shaft to move said filler bars to clamp the ties between said filler bars and the surface of the bale while being buckled, substantially as set forth.

2. The combination with a cotton compress of platens formed with channels, filler bars mounted in each of said channels, a crank-shaft mounted on each edge of each platen and connected to each of said filler bars, and means for operating said crankshaft to clamp the bale ties between said filler bars and the bale, substantially as set forth.

In witness whereof, I have hereunto set my hand and seal at Washington, District of Columbia, this twenty-third day of May, A. D. nineteen hundred and eighteen.

WILLIAM GRUBB TURNER. [L. S.]

Witnesses:
 E. W. BRADFORD,
 CHAS. E. RIORDON.